March 5, 1940.  R. TAMPIER  2,192,871
MEANS FOR CONTROLLING THE MOVEMENTS OF AILERONS,
RUDDERS, AND ELEVATORS OF AIRCRAFT
Filed April 27, 1938
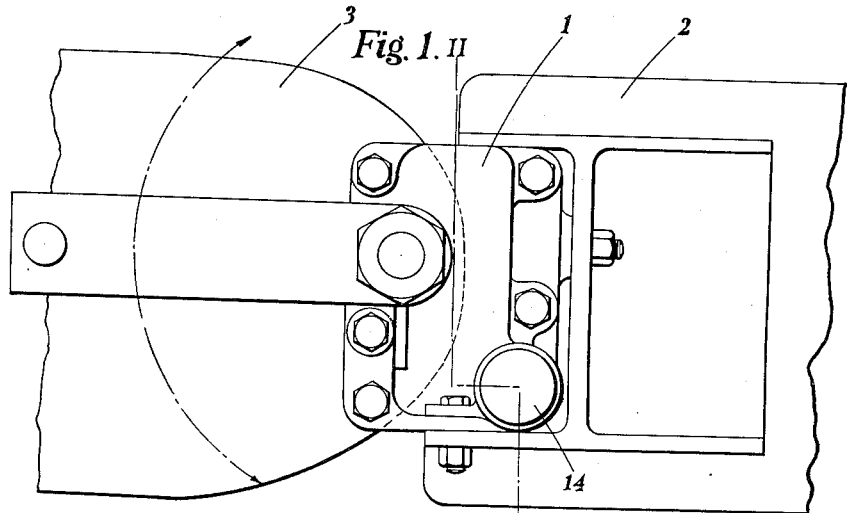
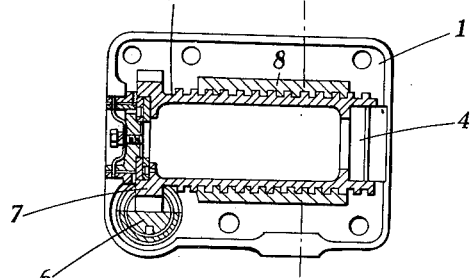
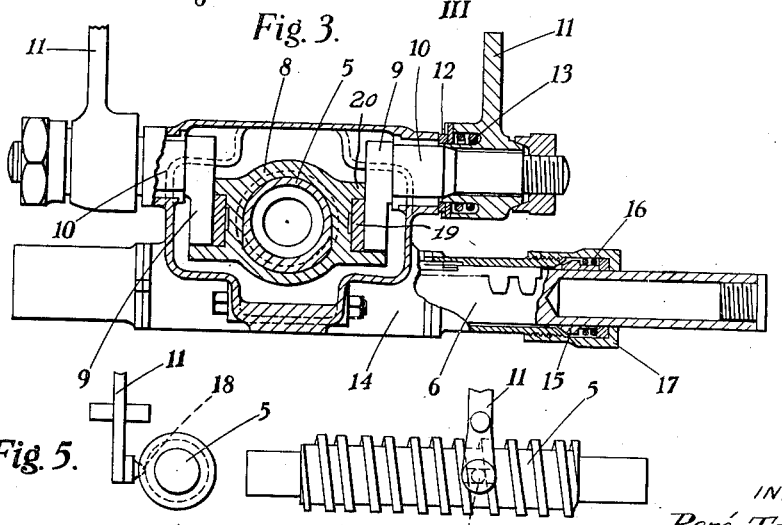
INVENTOR
René Tampier
BY
ATTORNEY Patented Mar. 5, 1940

2,192,871

UNITED STATES PATENT OFFICE 2,192,871

MEANS FOR CONTROLLING THE MOVEMENTS OF AILERONS, RUDDERS, AND ELEVATORS OF AIRCRAFT

René Tampier, Boulogne-sur-Seine, France

Application April 27, 1938, Serial No. 204,545
In Great Britain May 6, 1937

12 Claims. (Cl. 74—499)

This invention relates to means for controlling the movements of ailerons, rudders and elevators of aircraft.

At the present time the controls for the moving surfaces of aircraft necessitate the employment of levers on the wing spars or other part of the body of the craft and levers on the moving surfaces, the two levers being connected by wires or connecting rods arranged external to the wings or fuselage, passages or holes being furnished in the coverings of the respective parts to permit the passage of the controls.

The objects of the present invention are to provide a device for controlling the moving surfaces and/or the hinges connecting same to the fixed surfaces by means of which shocks or vibrations caused by the differences of pressure of the air, whether the craft is in flight or on the ground, do not affect the control transmissions to any marked extent, to so arrange said means as to avoid causing any air resistance, and to prevent backlash in the transmission between the control handle and the part controlled.

With these objects in view a control device for controlling the movements of ailerons, rudders, elevators and like control surfaces of aircraft, made according to the present invention comprises a screw secured against axial movement, a pinion operatively connected to said screw, a rack adapted to be operated from the cockpit, and engaging said pinion, whereby when the rack is operated the pinion and screw are rotated, a member engaging said screw and adapted to move along said screw when the latter is rotated, means for operably connecting said member to the control surface, said means comprising at least one arm, one end of which is operably mounted on the said member and the other end of which is adapted to be connected through an intermediately disposed pivot to the control surface.

Any desired number of devices constructed in accordance with this invention may be employed for connecting a moving surface to the fixed surface, each of them having to support a small load. One advantage obtained by the use of a plurality of irreversible devices against a single device resides in the fact that it is difficult with a screw designed with a coarse thread to obtain the correct theoretical form, and, an aileron, for example, controlled by a single device will tend to move in a somewhat spasmodic or jerky manner, whereas when a plurality of such devices are employed having a fine thread, the action will be more even and regular.

Two constructional forms of the device according to the invention are illustrated in the accompanying drawing in which—

Figure 1 is an end view showing the first constructional form of the device in position between a fixed part of an aircraft and a moving part;

Figure 2 is a section on the line II—II of Figure 1;

Figure 3 is a section on the line III—III of Figure 2;

Figure 4 is a diagrammatic side elevation of the second constructional form of the device, and, Figure 5 is an end view of Figure 4.

Referring to Figures 1 to 3, the device comprises a box 1 provided with bolts to enable same to be mounted, for example, wholly or partly between a wing 2 and an aileron 3 or between a fin and a rudder, or between a fin and an elevator replacing the ordinary hinge or hinges. This box is furnished with a bearing 4 adapted to receive a short shaft 5 on the outer end of which may be secured a lever connected by cables or rods to the control column, or to an electric or hydraulic device controlled directly or indirectly by the pilot. In the example shown the shaft 5 is not directly operated but is driven by a sliding rack member 6 meshing with a pinion 7 on the outer end of the said shaft. The inner end of the short shaft within the box is provided with a screw engaging in a nut sleeve 8 which co-operates with crank arms 9, 9 secured at one end to spindles 10, 10 disposed at right angles to the screw shaft, the spindles passing through bearings provided in the side walls of the box. The other ends of the crank arms 9, 9 are operably mounted on the outer faces of ring members 19 rotatably mounted in circular bearings 20 formed at the sides of the nut member 8. The controlled surface is attached directly to the spindles 10 by means of arms 11, 11 connected thereto. Between the inner face of the boss of each arm 11 and the adjacent part of the box 1 a friction washer 12 is disposed, this washer being pressed into engagement by a spring 13. One object of this friction device is to damp out any vibrations of the control surface and reduce their action on the nut. Another object of the friction device is to change the critical point at which the nut and screw change from an irreversible device into a reversible device as hereafter more fully described. The rack member 6 is mounted in an internally cylindrical eccentric which in turn is eccentrically mounted in a casting 14 so that rotation of the eccentric varies the distance between the rack member and the pinion 7. To eliminate the effect of vibration on the rack member 6 a friction device is provided comprising a split sleeve 15 having a conical face engaging with a corresponding face on the casting 14; this sleeve is forced inwards by a spring 16, the compression of which can be varied by a nut 17 engaging with the casting 14.

The device described is designed to be reversible above certain loads, the pitch of the nut and thread being suitably designed to this end. As above mentioned the spring 13 of the friction device may be changed to vary the friction of the whole system and in this way to change the critical point at which the device changes from an irreversible device (below certain loads) to a reversible device (above certain loads).

Referring to Figures 4 and 5 the screw on the shaft 5 engages with a conical pin 18 carried on the end of the arm 11 connected to the aileron or other moving part.

The connecting rod or rods for operating the screwed shafts can be located inside or outside the wings or fixed surfaces. When located outside said surfaces, said rod or rods being arranged parallel to the axis of the hinge, can be disposed so that they do not appear outside the aircraft.

What I claim is:

1. A control device for controlling the movements of ailerons, rudders, elevators and like control surfaces of aircraft, comprising a screw secured against axial movement, a pinion operatively connected to said screw, a rack adapted to be operated from the cockpit and engaging said pinion, whereby when the rack is operated the pinion and screw are rotated, a member engaging said screw and adapted to move along said screw when the latter is rotated, means for operably connecting said member to the control surface, said means comprising at least one arm, one end of which is operably mounted on the said member and the other end of which is adapted to be connected through an intermediately disposed pivot to the control surface.

2. A control device for controlling the movements of ailerons, rudders, elevators and like control surfaces of aircraft comprising a screw secured against axial movement, a pinion operatively connected to said screw, a rack adapted to be operated from the cockpit and engaging said pinion, whereby when the rack is operated the pinion and screw are rotated, a nut having a unidirectional screw thread adapted to be translated along said screw when the latter is rotated, means for operatively connecting the nut to the control surface, said means comprising at least one arm, one end of which is operably mounted on the nut and the other end of which is adapted to be connected through an intermediately disposed pivot to the control surface.

3. A control device for controlling the movements of ailerons, rudders, elevators and like control surfaces of aircraft comprising a screw secured against axial movement, a pinion operatively connected to said screw, a rack adapted to be operated from the cockpit and engaging said pinion, whereby when the rack is operated the pinion and screw are rotated, a nut having a unidirectional screw thread adapted to be translated along said screw when the latter is rotated, means for operatively connecting the nut to the control surface, said means comprising a bearing in said nut, a disc rotatably mounted in said bearing, an arm, one end of which is operably connected to said disc, and the other end of which is adapted to be connected through an intermediately disposed pivot to the control surface.

4. A control device for controlling the movements of ailerons, rudders, elevators and like control surfaces of aircraft comprising a screw secured against axial movement, a pinion operatively connected to said screw, a rack adapted to be operated from the cockpit and engaging said pinion, whereby when the rack is operated the pinion and screw are rotated, a nut having a unidirectional screw thread adapted to be translated along said screw when the latter is rotated, means for operatively connecting the nut to the control surface, said means comprising a bearing in said nut, a disc rotatably mounted in said bearing, a casing enclosing the screw and nut, a bearing in said casing, a crank arm, one end of which is operably connected to said disc and the other end of which passes through the bearing in the casing and is adapted to be connected to the control surface.

5. A control device for controlling the movement of ailerons, rudders, elevators and like control surfaces of aircraft comprising a screw secured against axial movement, a pinion operatively connected to said screw, a rack adapted to be operated from the cockpit and engaging said pinion, whereby when the rack is operated the pinion and screw are rotated, a nut having a unidirectional screw thread adapted to be translated along said screw when the latter is rotated, means for operatively connecting the nut to the control surface, said means comprising a bearing in said nut, a disc rotatably mounted in said bearing, a casing enclosing the screw and nut, a bearing in said casing, a crank arm, one end of which is operably connected to said disc and the other end of which passes through the bearing in the casing and extends outside thereof, and a second arm, connected between the free end of said crank arm and the control surface.

6. A control device for controlling the movements of ailerons, rudders, elevators and like control surfaces of aircraft comprising a screw secured against axial movement, a pinion operatively connected to said screw, a rack adapted to be operated from the cockpit and engaging said pinion, whereby when the rack is operated the pinion and screw are rotated, a nut having a unidirectional screw thread adapted to be translated along said screw when the latter is rotated, means for operatively connecting the nut to the control surface, said means comprising a bearing in said nut, a disc rotatably mounted in said bearing, a casing enclosing the screw and nut, a bearing in said casing, a crank arm, one end of which is operably connected to said disc and the other end of which passes through the bearing in the casing and extends outside thereof, a second arm, connected between the free end of said crank arm and the control surface, and a friction device operatively disposed between the casing and the said second arm, said friction device being adapted to damp out any vibrations of the control surface and reduce their action on the nut.

7. A control device according to claim 6 wherein the thread pitch of the nut and screw is designed to enable the device to be reversible above certain loads with a given friction device.

8. A control device according to claim 6 wherein the thread pitch of the nut and screw is designed to provide an irreversible device.

9. A control device according to claim 6 wherein said means for operatively connecting the nut to the control surfaces are provided on two sides of the device.

10. A control device according to claim 6 in which the rack is formed on a cylindrical rod and further comprising an eccentric in which the cylindrical rod is mounted, whereby rotation of the eccentric varies the distance between the rack and the pinion.

11. A control device according to claim 6 operatively disposed between a fixed part of an aircraft and a control surface thereof, thereby constituting a direct hinge connection.

12. A control device for controlling the movements of ailerons, rudders, elevators and like control surfaces of aircraft, comprising a screw secured against axial movement, a pinion operatively connected to said screw, a rack adapted to be operated from the cockpit and engaging said pinion, whereby when the rack is operated the pinion and screw are rotated, a conical pin engaging said screw and adapted to be oscillated along said screw when the later is rotated, means for operably connecting said conical pin to the control surface, said means comprising at least one arm, one end of which is operably mounted on said conical pin and the other end of which is adapted to be connected through an intermediately disposed pivot to the control surface.

RENÉ TAMPIER.